(12) United States Patent
Choi et al.

(10) Patent No.: US 11,912,868 B2
(45) Date of Patent: Feb. 27, 2024

(54) CONDUCTIVE CONCENTRATED RESIN COMPOSITION, CONDUCTIVE POLYAMIDE RESIN COMPOSITION COMPRISING CONDUCTIVE CONCENTRATED RESIN COMPOSITION, METHOD OF PREPARING SAME AND MOLDED ARTICLE

(71) Applicant: LG CHEM, LTD., Seoul (KR)

(72) Inventors: Gi Dae Choi, Daejeon (KR); Minsu Kim, Daejeon (KR); Eon Seok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 461 days.

(21) Appl. No.: 16/957,555

(22) PCT Filed: Nov. 8, 2019

(86) PCT No.: PCT/KR2019/015134
§ 371 (c)(1),
(2) Date: Jun. 24, 2020

(87) PCT Pub. No.: WO2020/096400
PCT Pub. Date: May 14, 2020

(65) Prior Publication Data
US 2020/0332119 A1 Oct. 22, 2020

(30) Foreign Application Priority Data
Nov. 8, 2018 (KR) .................. 10-2018-0136373

(51) Int. Cl.
| | | |
|---|---|---|
| *C08L 77/02* | (2006.01) | |
| *C08L 23/06* | (2006.01) | |
| *C08L 23/12* | (2006.01) | |
| *C08L 23/16* | (2006.01) | |
| *C08L 25/10* | (2006.01) | |
| *C08K 3/04* | (2006.01) | |

(52) U.S. Cl.
CPC ............... *C08L 77/02* (2013.01); *C08L 23/06* (2013.01); *C08L 23/12* (2013.01); *C08L 23/16* (2013.01); *C08L 25/10* (2013.01); *C08K 3/046* (2017.05); *C08K 2201/006* (2013.01)

(58) Field of Classification Search
CPC ..... C08K 3/04–046; C08K 3/34; C08L 23/04; C08L 23/08; C08L 23/0807; C08L 23/0815; C08L 23/14; C08L 23/142
See application file for complete search history.

(56) References Cited

U.S. PATENT DOCUMENTS

| | | | |
|---|---|---|---|
| 5,843,340 A | 12/1998 | Silvi et al. | |
| 2006/0231792 A1* | 10/2006 | Drzal | C08K 7/00 524/495 |
| 2020/0062957 A1* | 2/2020 | Seo | C08K 9/04 |

FOREIGN PATENT DOCUMENTS

| | | |
|---|---|---|
| CN | 1206028 A | 1/1999 |
| CN | 1869123 A | 11/2006 |
| CN | 105086443 A | 11/2015 |
| CN | 108102358 A | 6/2018 |
| JP | 2003238800 A | 8/2003 |
| JP | 2004-2898 A | 1/2004 |
| JP | 2004-143236 A | 5/2004 |
| JP | 2004-143238 A | 5/2004 |
| JP | 2005-508425 A | 3/2005 |
| JP | 4183297 B2 | 11/2008 |
| JP | 2010-514883 A | 5/2010 |
| JP | 4803738 B2 | 10/2011 |
| JP | 2013-000913 A | 1/2013 |
| KR | 10-2011-0108976 A | 10/2011 |
| KR | 10-2012-0070912 A | 7/2012 |
| KR | 10-2015-0110058 A | 10/2015 |
| KR | 10-2015-0116781 A | 10/2015 |
| KR | 10-2017-0080172 A | 7/2017 |
| KR | 10-2017-0090040 A | 8/2017 |
| KR | 10-2019-0030507 A | 3/2019 |
| WO | WO 2018/084475 | * 5/2018 |

* cited by examiner

*Primary Examiner* — Ana L. Woodward
(74) *Attorney, Agent, or Firm* — Bryan Cave Leighton Paisner LLP

(57) ABSTRACT

The present invention relates to a conductive concentrated resin composition including (a) 100 parts by weight of a base resin including 50 to 95% by weight of a polyamide resin, 2.5 to 20% by weight of a polar polymer, and 2.5 to 30% by weight of a non-polar polymer, (b) 10 to parts by weight of a carbon nanofibril, (c) 0.5 to 5 parts by weight of a carbon nanoplate, and (d) 0.5 to 4 parts by weight of nanoclay; a conductive polyamide resin composition including the conductive concentrated resin composition; a method of preparing the conductive concentrated resin composition; and a molded article including the conductive polyamide resin composition.

When a polyamide alloy resin composition is prepared using the conductive concentrated resin composition of the present invention, compatibility between compositions and dispersion stability may be improved, thereby significantly increasing moisture stability while maintaining mechanical strength, conductivity, heat resistance, and appearance properties equal or superior to those of a conventional conductive polyamide alloy resin composition.

9 Claims, 1 Drawing Sheet

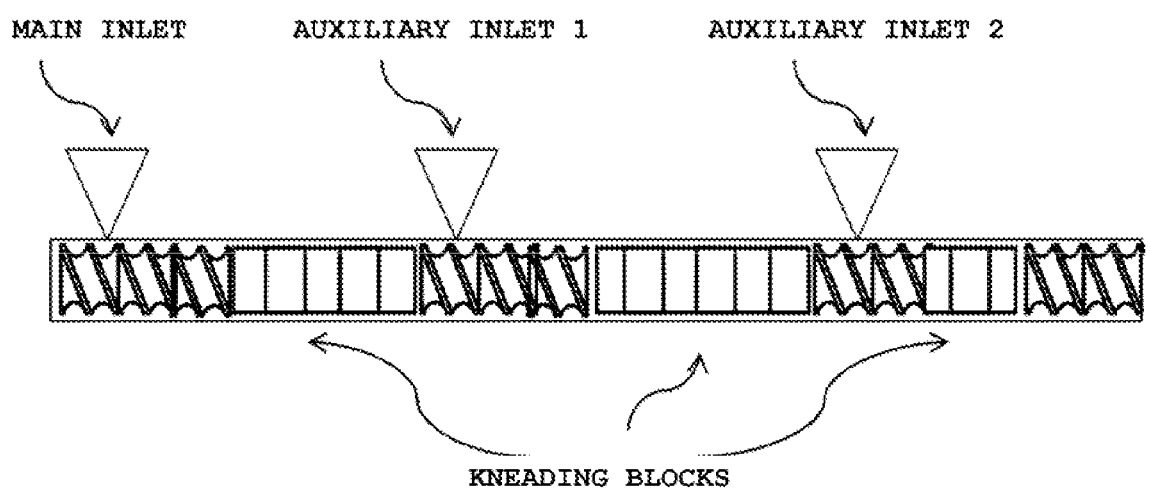

CONDUCTIVE CONCENTRATED RESIN COMPOSITION, CONDUCTIVE POLYAMIDE RESIN COMPOSITION COMPRISING CONDUCTIVE CONCENTRATED RESIN COMPOSITION, METHOD OF PREPARING SAME AND MOLDED ARTICLE

TECHNICAL FIELD

The present invention relates to a conductive concentrated resin composition, a conductive polyamide resin composition including the conductive concentrated resin composition, a method of preparing the conductive polyamide resin composition, and a molded article including the conductive polyamide resin composition. More specifically, the present invention relates to a conductive concentrated resin composition having increased mechanical strength and conductivity by improving the dispersion stability of a conductive material, having improved heat resistance and surface properties by including a nanosilicate, and having excellent moisture stability by including a polar polymer and a non-polar polymer in a specific weight ratio; a conductive polyamide resin composition including the conductive concentrated resin composition; a method of preparing the conductive polyamide resin composition, and a molded article including the conductive polyamide resin composition.

BACKGROUND ART

Polyamide resins, a type of engineering plastic, have excellent mechanical strength, processability, durability, chemical resistance, and weather resistance. Due to these advantages, polyamide resins have been used in various fields such as engine parts, automotive exterior materials, electrical and electronic parts, and industrial materials.

In addition to the above-described physical properties of polyamide resins, to improve additional physical properties such as heat resistance, electrical properties, and moisture stability, a technique of alloying other resin components, e.g., a polyphenylene ether resin, with a polyamide resin has been developed.

Meanwhile, to apply a polyamide/polyphenylene ether alloy resin composition to products requiring a process such as electrostatic painting, a method of mixing a polyamide/polyphenylene ether alloy resin composition with a conductive filler such as carbon black is used. However, conductive fillers are expensive, and handling thereof is difficult. In addition, use of fibrous fillers causes a deterioration in moldability. In addition, when an excess of a conductive filler is used to secure the level of conductivity required in the art, physical properties such as impact resistance and moldability may be deteriorated.

For example, a composition prepared by introducing an impact modifier, a low-molecular weight compatibilizer, and a conductive carbon filler into an alloy resin has been proposed. However, final products manufactured using the composition have excellent impact strength but poor heat resistance. In addition, the composition is limited in improving surface properties due to dispersion limit.

In addition, a method of preparing a master pellet for polyamide/polyphenylene ether resin compositions by feeding polyamide into the top of an extruder and feeding conductive carbon black into the bottom of the extruder has been proposed. However, the method is limited in improving dispersion stability, and is less effective for improving the surface properties, heat resistance, and moisture stability of a product.

[Related Art Documents]
[Patent Document] JP 4183297 B1

DISCLOSURE

Technical Problem

Therefore, the present invention has been made in view of the above problems, and it is one object of the present invention to provide a conductive concentrated resin composition for alloying polyamide and a method of preparing the conductive concentrated resin composition. According to the present invention, by improving compatibility between compositions or dispersion stability, the conductive concentrated resin composition has excellent mechanical strength, conductivity, heat resistance, appearance properties, and moisture stability compared to conventional compositions.

It is another object of the present invention to provide a conductive polyamide resin composition having excellent heat resistance, appearance properties, and moisture stability by including the conductive concentrated resin composition, compared to conventional resin compositions.

It is yet another object of the present invention to provide a molded article manufactured using the conductive polyamide resin composition.

The above and other objects of the present invention can be achieved by the present invention described below.

Technical Solution

In accordance with one aspect of the present invention, provided is a conductive concentrated resin composition including (a) 100 parts by weight of a base resin including 50 to 95% by weight of a polyamide resin, 2.5 to 20% by weight of a polar polymer, and 2.5 to 30% by weight of a non-polar polymer; (b) 10 to 40 parts by weight of a carbon nanofibril; (c) 0.5 to 5 parts by weight of a carbon nanoplate; and (d) 0.5 to 4 parts by weight of a nanosilicate.

For example, the polyamide resin may include one or more selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I.

For example, the polar polymer may be an olefin block copolymer having a polar group, and the non-polar polymer may be an olefin block copolymer having no polar group.

For example, the polar group may be a carboxyl group.

For example, the polar polymer may be a polymer including 0.5 to 3% by weight of a monomer having a polar group.

For example, the carbon nanofibril may have a BET surface area of 180 to 600 $m^2/g$.

For example, the carbon nanoplate may have an average thickness of 2 to 50 nm.

In accordance with another aspect of the present invention, provided is a conductive polyamide resin composition including 5 to 20% by weight of the conductive concentrated resin composition; 35 to 65% by weight of a polyamide resin; 0 to 40% by weight of a poly(arylene oxide) resin; 0 to 15% by weight of an impact modifier; 1 to 15% by weight of a polar polymer; 1 to 20% by weight of a non-polar polymer; and 0 to 35% by weight of an inorganic filler.

For example, the impact modifier may include one or more selected from the group consisting of an aromatic vinyl elastomer and an olefin elastomer.

For example, the aromatic vinyl elastomer may include one or more selected from styrene-butadiene-styrene (SBS) copolymers, styrene-ethylene-butylene-styrene (SEBS) copolymers, styrene-butadiene (SB) copolymers, styrene-isoprene (SI) copolymers, styrene-isoprene-styrene (SIS) copolymers, alpha-methylstyrene-butadiene copolymers, styrene-ethylene-propylene copolymers, styrene-ethylene-propylene-styrene copolymers, styrene-(ethylene-butylene/styrene copolymer)-styrene copolymers, and modified polymers thereof.

For example, the olefin elastomer may include one or more selected from high-density polyethylenes (HDPEs), low-density polyethylenes (LDPEs), polypropylenes (PPs), ethylene-propylene (EPM) copolymers, ethylene-propylene-diene (EPDM) copolymers, ethylene-butene copolymers, ethylene-octene copolymers, and modified polymers thereof.

For example, the inorganic filler may include one or more selected from the group consisting of glass fiber, carbon fiber, talc, mica, wollastonite, barium sulfate, barium carbonate, and silica.

For example, the conductive polyamide resin composition may have a moisture absorption rate of 1.5% or less.

In accordance with still another aspect of the present invention, provided is a method of preparing a conductive concentrated resin composition, the method including kneading and extruding (a) 100 parts by weight of a base resin including 50 to 95% by weight of a polyamide resin, 2.5 to 20% by weight of a polar polymer, and 2.5 to % by weight of a non-polar polymer; (b) 10 to 40 parts by weight of a carbon nanofibril; (c) 0.5 to 5 parts by weight of a carbon nanoplate; and (d) 0.5 to 4 parts by weight of a nanosilicate using an extruder equipped with 9 or more kneading blocks.

For example, the kneading and extruding may be performed at a cylinder temperature of 200 to 330° C.

For example, the kneading and extruding may performed at a rate of screw rotation of 100 to 500 rpm.

In accordance with yet another aspect of the present invention, provided is a molded article including the conductive polyamide resin composition.

Advantageous Effects

A conductive concentrated resin composition according to the present invention has improved mechanical strength, conductivity, and heat resistance due to a mutual dispersion effect between a fibrous filler and a plate-shaped filler and a nanosilicate. In addition, since the conductive concentrated resin composition includes a polar polymer and a non-polar polymer in a predetermined weight ratio, the conductive concentrated resin composition has excellent moisture stability. Accordingly, a conductive polyamide resin composition including the conductive concentrated resin composition has excellent heat resistance, moisture stability, and appearance properties while maintaining mechanical strength and conductivity equal or superior to those of a conventional resin composition.

DESCRIPTION OF DRAWINGS

FIG. 1 illustrates an extruder equipped with 9 or more kneading blocks, which is used to prepare a conductive concentrated resin composition of the present invention.

BEST MODE

Hereinafter, a conductive concentrated resin composition and a method of preparing the same according to the present invention will be described in detail.

The present inventors confirmed that, when a conductive concentrated resin composition was prepared by adding a polar polymer and a non-polar polymer prepared in a predetermined weight ratio, a carbon nanofibril, a carbon nanoplate, and nanoclay to a polyamide 66 resin, which has good mechanical strength but poor moisture stability compared to other engineering plastics; performing mixing to prepare a mixture; and melt-kneading the mixture using a twin-screw extruder equipped with 9 or more kneading blocks, and when the prepared conductive concentrated resin composition was used to prepare a conductive polyamide resin composition, the conductive polyamide resin composition had excellent moisture stability while maintaining mechanical strength, moldability, conductivity, heat resistance, and surface properties equal or superior to those of a conventional alloy resin composition. Based on these results, the present inventors conducted further studies to complete the present invention.

In the present invention, the "conductive concentrated resin composition" refers to a composition including 10% by weight or more of a conductive filler based on a total weight of the composition.

The concentrated resin composition of the present invention includes (a) 100 parts by weight of a base resin including 50 to 95% by weight of a polyamide resin, 2.5 to % by weight of a polar polymer, and 2.5 to 30% by weight of a non-polar polymer; (b) 10 to 40 parts by weight of a carbon nanofibril; (c) 0.5 to 5 parts by weight of a carbon nanoplate; and (d) 0.5 to 4 parts by weight of a nanosilicate. Accordingly, due to a mutual dispersion effect between the fibrous carbon nanofibril and the plate-shaped carbon nanoplate, conductivity may be greatly improved while maintaining mechanical properties. In addition, heat resistance may be improved due to the nanosilicate, and moisture stability may be greatly improved by combination of the polar polymer and the non-polar polymer.

The polyamide resin may be appropriately selected within the range commonly used in the art without particular limitation. Preferably, the polyamide resin includes one or more selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I.

As a preferred example, the polyamide resin is a homopolymer or a copolymer including one or more selected from polyamide 6, polyamide 66, polyamide 46, polyamide 11, and polyamide 12. Most preferably, the polyamide resin is polyamide 66. In this case, the conductivity, moldability, and heat resistance of the composition may be improved.

For example, the polyamide resin may be included in an amount of 50 to 95% by weight, preferably 55 to 90% by weight, more preferably 60 to 85% by weight. Within this range, mechanical properties, durability, and weather resistance may be excellent.

For example, the polar polymer may be an olefin block copolymer having a polar group. In this case, moisture stability may be excellent without deterioration in other physical properties.

For example, the polar group may be a carboxyl group. In this case, moisture stability may be excellent without deterioration in other physical properties.

For example, the olefin block copolymer having a polar group may be an ethylene-α-olefin copolymer modified with at least one of α,β-unsaturated dicarboxylic acid and anhydrides thereof. In this case, moisture stability is greatly improved. Thus, a composition including the olefin block copolymer has excellent dimensional stability, so that the original size of the composition may be maintained even under various environmental conditions.

For example, the α-olefin included in the polar polymer may be an α-olefin having 3 to 10 carbon atoms or an α-olefin having 5 to 10 carbon atoms, preferably 1-octene. Within this range, moisture stability may be greatly improved.

In the present invention, modification may be performed using a method of modifying a polymer commonly used in the art to which the present invention pertains, without particular limitation. For example, modification may be performed by adding at least one of α,β-unsaturated dicarboxylic acid and anhydrides thereof to an unmodified polymer and performing graft polymerization. As another example, modification may be performed by adding at least one of α,β-unsaturated dicarboxylic acid and anhydrides thereof as a comonomer to an unmodified copolymer and performing copolymerization.

For example, the α,β-unsaturated dicarboxylic acid and the anhydrides thereof may include maleic acid, fumaric acid, citric acid, and anhydrides thereof, preferably maleic anhydride. In this case, moisture stability may be greatly improved.

For example, the polar polymer may be a polymer including a monomer having a polar group in an amount of 0.5 to 4% by weight, 0.5 to 3% by weight, 0.5 to 2.5% by weight, or 0.8 to 2% by weight. Within this range, moisture stability may be excellent.

For example, the polar polymer may have a melt index (measured under conditions of 190° C. and 2.16 kg according to ASTM D1238) of 0.5 to 10 g/10 min or 1 to 7 g/10 min. Within this range, compatibility and processability may be excellent.

For example, the polar polymer may have a number average molecular weight of 50,000 to 400,000 g/mol, preferably 100,000 to 300,000 g/mol. Within this range, both physical properties and processability may be excellent.

In the present invention, a number average molecular weight may be measured by GPC analysis and using polystyrene (PS) as a standard material.

For example, the polar polymer may be included in an amount of 2.5 to 20% by weight, preferably 3 to 15% by weight. Within this range, moisture stability may be excellent.

For example, the non-polar polymer may be an olefin block copolymer having no polar group. In this case, moisture stability may be excellent without deterioration in other physical properties.

For example, the non-polar polymer may be an ethylene-α-olefin copolymer not modified with a compound having a polar group. In this case, moisture stability may be greatly improved.

For example, the α-olefin copolymer included in the non-polar polymer may be an α-olefin having 3 to 10 carbon atoms or an α-olefin having 3 to 4 carbon atoms, preferably 1-butene. In this case, moisture stability may be greatly improved.

For example, the non-polar polymer may have a melt index (measured under conditions of 190° C. and 2.16 kg according to ASTM D1238) of 5 to 40 g/10 min, 10 to 35 g/10 min, 20 to 35 g/10 min, or 30 to 35 g/10 min. Within this range, physical properties and processability may be excellent.

For example, the non-polar polymer may have a density of 0.840 to 0.920 g/cm 3 and a weight average molecular weight of 100,000 to 600,000 g/mol, preferably 120,000 to 500,000 g/mol. Within this range, physical properties and processability may be excellent.

In the present invention, density is measured at room temperature (20±5° C.).

In the present invention, a weight average molecular weight may be measured by GPC analysis and using polystyrene (PS) as a standard material.

For example, the non-polar polymer may be included in an amount of 2.5 to 30% by weight, preferably 5 to 25% by weight. Within this range, moisture stability may be excellent.

The carbon nanofibril refers to a fibrous carbon material having a nanometer-scale thickness or diameter, and may include a carbon nanofiber, a carbon nanotube, or both. In this case, a final product may have excellent conductivity, mechanical strength, and heat resistance. With respect to conductivity and mechanical properties, the carbon nanofibril preferably includes a carbon nanotube.

In the present invention, nanoscale means a range of 100 nm or less, specifically 1 to 100 nm, unless otherwise defined.

As a specific example, the carbon nanotube may include one or more selected from a single-walled carbon nanotube (SWCNT), a double-walled carbon nanotube (DWCNT), and a multi-walled carbon nanotube (MWCNT).

In addition, the carbon nanotube may be a bundle type (rope type) or a non-bundle type (entangled type), and the type of carbon nanotube may be appropriately selected without particular limitation.

In the present invention, the 'bundle type' refers to a bundle or rope in which a plurality of carbon nanotubes is arranged or entangled.

In the present invention, the 'non-bundle type' refers to a shape without a constant pattern as in the bundle or rope type.

For example, the carbon nanofibril may have a BET surface area of 180 to 600 $m^2/g$ or 200 to 400 $m^2/g$, preferably 200 to 300 $m^2/g$. Within this range, processability of a resin composition may be excellent, and conductivity may be increased. When the BET surface area of the carbon nanofibril is too small, a particle size may be increased, leading to decrease in conductivity. When the BET surface area of the carbon nanofibril is too large, an excess of tension is applied to a molten composition during melting and kneading, which is undesirable in view of processability.

In the present invention, BET surface area may be measured using a Brunauer-Emmett-Teller method (according to ASTM 6556) using nitrogen adsorption.

In addition, the carbon nanofibril may have an average diameter of 5 to 30 nm, 7 to 20 nm, or 10 to 15 nm. Within this range, the conductivity and appearance properties of a final product may be greatly improved.

The diameter of the carbon nanofibril may be measured by electron microscope analysis.

For example, the carbon nanofibril may be included in an amount of 10 to 40 parts by weight, preferably 15 to parts by weight, more preferably 15 to 25 parts by weight, based on 100 parts by weight of a base resin. Within this range, mechanical properties and conductivity may be excellent.

The carbon nanoplate is a plate-shaped carbon nanomaterial having an average thickness of 2 to 50 nm, and may include one or more selected from exfoliated graphite, graphene nanoplates, and exfoliated and expanded graphite. Preferably, the carbon nanoplate includes a graphene nanoplate having an average thickness of 2 to 50 nm.

In this case, a mutual dispersion effect between the carbon nanoplate and the carbon nanofibril, which is a fibrous conductive filler, may further improve the electrical properties, mechanical strength, and heat resistance of a polyamide resin composition.

For example, the carbon nanoplate may have an average thickness of 2 to 50 nm, preferably 4 to 40 nm. Within this range, due to a mutual dispersion effect, conductivity and surface properties may be improved.

The thickness of the carbon nanoplate may be measured through conventional electron microscope analysis.

In addition, in consideration of improvement of physical properties and processability, a layered and exfoliated carbon nanoplate is preferably used.

In the present invention, the term 'layered and exfoliated' refers to a form obtained by processing graphite to a thickness of 2 to 100 nm using chemical and/or physical methods.

The method of chemically and/or physically exfoliating graphite is based on known techniques. For example, graphite may be chemically modified and expanded using Brodie's method, Hummers' method, or the like, and then exfoliated using a mechanical method such as ultrasonic crushing or rapid heating.

For example, the carbon nanoplate may be included in an amount of 0.5 to 5 parts by weight, preferably 1 to 4 parts by weight, based on 100 parts by weight of a base resin. Within this range, mechanical properties and conductivity may be excellent.

As another example, the conductive concentrated resin composition of the present invention may include (a) 100 parts by weight of a base resin including 50 to 95% by weight of a polyamide resin, 2.5 to 20% by weight of a polar polymer, and 2.5 to 30% by weight of a non-polar polymer; (b) 10 to 40 parts by weight of a carbon nanofibril having a BET surface area of 180 to 600 $m^2/g$; (c) 0.5 to 5 parts by weight of a carbon nanoplate having an average thickness of 2 to 50 nm; and (d) 0.5 to 4 parts by weight of a nanosilicate. Accordingly, due to a mutual dispersion effect between the fibrous carbon nanofibril and the plate-shaped carbon nanoplate, conductivity may be greatly improved while maintaining mechanical properties. In addition, heat resistance may be improved due to the nanosilicate, and moisture stability may be greatly improved by combination of the polar polymer and the non-polar polymer.

A material, such as a silicate having a particle diameter of 100 nm or less or 1 to 100 nm, which is referred to as a nanosilicate in the art to which the present invention pertains, may be used as the nanosilicate of the present invention without particular limitation. Preferably, nanoclay is used as the nanosilicate. In this case, heat resistance may be excellent.

In the present invention, the particle diameter of the nanosilicate may be measured using a measurement method, such as electron microscope analysis, commonly used in the art to which the present invention pertains. As another specific example, dynamic light scattering may be used.

The nanoclay is a layered structure in which plate-shaped silicates are laminated in a nanoscale. In the present invention, the nanoclay is used to obtain a mutual dispersion effect between the carbon nanofibril and the nanoclay and improve the heat resistance and dimensional stability of a composition.

In the present invention, in the nanoclay, the thickness of each layer may be nanoscale, e.g., 1 to 100 nm, 1 to 50 nm, preferably 2 to 40 nm.

The thickness of the nanoclay may be measured through electron microscope analysis.

For example, the nanoclay may include one or more selected from smectite-based clay, kaolinite-based clay, and illite-based clay. More specifically, the nanoclay may include one or more selected from montmorillonite, saponite, hectorite, vermiculite, kaolinite, and hydromica, most preferably montmorillonite. In this case, the heat resistance of a composition may be further improved.

In addition, the nanoclay is subjected to organification treatment using a conventional modifier and then used. In this case, due to improved compatibility with organic materials, the heat resistance of a final molded article may be excellent.

For example, the modifier may be selected from tetra-alkyl ammonium salts, tetra-alkyl phosphonium salts, and ammonium salts containing alkyl and aryl groups. Specifically, the modifier may include one or more selected from dimethyl benzyl hydrogenated tallow quaternary ammonium, dimethyl hydrogenated tallow quaternary ammonium, methyl tallow bis-2-hydroxyethyl quaternary ammonium, and dimethyl hydrogenated tallow 2-ethylhexyl quaternary ammonium. In this case, the heat resistance of a final product may be excellent.

As a most preferred example, the nanoclay includes montmorillonite, which has been subjected to organification treatment using methyl tallow bis-2-hydroxyethyl quaternary ammonium as the modifier. In this case, the heat resistance of a final resin composition may be excellent while maintaining the mechanical strength, conductivity, and processability thereof at high levels.

In the present invention, an organification treatment method commonly used in the art to which the present invention pertains may be used as the organification treatment method of the present invention without particular limitation. For example, the organification treatment method may include mixing, coating, ion exchange, substitution reaction, and the like.

For example, the nanosilicate may be included in an amount of 0.5 to 4 parts by weight, preferably 1 to 3 parts by weight, based on 100 parts by weight of a base resin. Within this range, mechanical properties and heat resistance may be excellent.

A method of preparing a conductive concentrated resin composition according to the present invention includes a step of kneading and extruding (a) 100 parts by weight of a base resin including 50 to 95% by weight of a polyamide resin, 2.5 to 20% by weight of a polar polymer, and 2.5 to 30% by weight of a non-polar polymer; (b) 10 to parts by weight of a carbon nanofibril; (c) 0.5 to 5 parts by weight of a carbon nanoplate; and (d) 0.5 to 4 parts by weight of a nanosilicate using an extruder equipped with 9 or more kneading blocks. Accordingly, due to a mutual dispersion effect between the fibrous carbon nanofibril and the plate-shaped carbon nanoplate, conductivity may be greatly improved while maintaining mechanical properties. In addition, heat resistance may be improved due to the nanosilicate, and moisture stability may be greatly improved by combination of the polar polymer and the non-polar polymer.

Typically, an extrusion process is performed by feeding a raw material into an extruder and melting and kneading the raw material in a heated cylindrical structure while applying pressure to the raw material. In the extrusion process, when mechanical pressure is applied to a molten raw material, the physical properties of the raw material may vary. In some cases, the shape of a raw material changes after melt kneading. Accordingly, by kneading and extruding a raw material under appropriately controlled extrusion conditions, the mechanical properties of the raw material may be improved.

In the present invention, raw materials are mixed in a specific composition, and then the mixture is kneaded and extruded using an extruder equipped with 9 or more kneading blocks to prepare a conductive concentrated resin composition. In this case, the dispersibility of a conductive filler and compatibility between compositions are improved. As a result, the conductive concentrated resin composition may have excellent conductivity, appearance properties, and moisture stability while maintaining mechanical strength and processability superior to those of a polyamide alloy resin composition that has a composition equivalent to that of the conductive concentrated resin composition.

FIG. 1 illustrates an extruder equipped with 9 or more kneading blocks, which is used to prepare the conductive concentrated resin composition of the present invention. Hereinafter, the present invention will be described with reference to FIG. 1.

The type of extruder is not particularly limited, and an extruder commonly used in the art may be appropriately selected and used. For example, a single-screw extruder equipped with one screw or a multi-screw extruder equipped with a plurality of screws may be used. Considering uniform kneading of materials, ease of processing, and economic efficiency, a twin-screw extruder equipped with two screws is preferably used.

A typical extruder includes a raw material feeder for feeding materials into a barrel, also called a cylinder, a screw for conveying and kneading the fed materials, and a die for extruding the kneaded materials. In this case, the screw consists of a plurality of screw elements for various functions.

In the typical extruder, one or more raw material feeders may be provided, and two or more, or three raw material feeders may be provided, as needed. In addition, a main inlet and optionally an auxiliary inlet may be provided, and two or more, or three auxiliary inlets may be optionally provided.

As a specific example, a base resin, a carbon nanofibril, a carbon nanoplate, and a nanosilicate may be fed into the main inlet batchwise. As another example, a base resin may be fed into the main inlet, and then a carbon nanofibril, a carbon nanoplate, and a nanosilicate may be fed into the auxiliary inlets.

As another example, a base resin may be fed into the main inlet, some of a carbon nanofibril, a carbon nanoplate, and a nanosilicate may be fed into an auxiliary inlet 1, and then the remainder may be fed into an auxiliary inlet 2.

As another example, a base resin may be fed into the main inlet, a carbon nanofibril, a carbon nanoplate, and a nanosilicate may be fed into the auxiliary inlet 1, and additives, such as an antioxidant and a heat stabilizer, may be fed into the auxiliary inlet 2.

The kneading blocks of the present invention correspond to the screw elements. Specifically, each kneading block consists of a plurality of discs, preferably 3 to 7 discs, 5 to 7 discs, 3 to 5 discs, or 4 to 5 discs, and has a polygonal cross section or an elliptical cross section. The kneading blocks are arranged continuously in a direction in which materials are conveyed. In addition, in the kneading block, the phase angle of the discs (indicating the travel angle between discs) is generally 45 to 90°.

In addition, the kneading block includes a forward kneading block capable of conveying, distributing, and mixing materials, a neutral kneading block capable of distributing and mixing materials without conveying capacity, and a backward kneading block capable of conveying materials in a direction opposite to the conveying direction.

For example, the conductive concentrated resin composition according to the present invention may be prepared using a method including a step of performing kneading and extruding using an extruder equipped with 9 or more, 10 or more, 10 to 18, or 12 to 16 kneading blocks. In this case, it may be effective to arrange the kneading blocks in the order of forward kneading blocks, neutral kneading blocks, and backward kneading blocks with respect to a resin flow direction. Depending on combination manners, a continuous or separate block combination may be used. In this case, the dispersibility of a conductive filler and compatibility between compositions may be further improved, and thus a high-quality polyamide alloy resin composition may be provided.

9 or more kneading blocks may be arranged continuously, or may be arranged discontinuously between screws. As a specific example, 3 to 6 kneading blocks may be provided continuously between the main inlet and the auxiliary inlet 1, 3 to 8 kneading blocks may be provided continuously between the auxiliary inlet 1 and the auxiliary inlet 2, and 2 to 5 kneading blocks may be provided between the auxiliary inlet 2 and an outlet (not shown). With this configuration, local heat generation during melt-kneading may be controlled to prevent thermal deformation of raw materials. In addition, excessive cutting of a carbon nanofibril may be prevented, thereby improving conductivity and physical properties.

In the preparation method of the present invention, the step of kneading and extruding may be performed at a barrel temperature of 200 to 330° C., 250 to 320° C., 280 to 310° C., or 290 to 310° C. In this case, a treatment amount per unit time may be appropriate, and at the same time melt kneading may be sufficiently performed. In addition, problems such as thermal decomposition of resin components may be prevented.

In addition, the step of kneading and extruding may be performed at a rate of screw rotation of 100 to 500 rpm, 150 to 400 rpm, 100 to 350 rpm, 150 to 320 rpm, 200 to 310 rpm, 250 to 350 rpm, or 250 to 310 rpm. In this case, a treatment amount per unit time may be appropriate. Thus, process efficiency may be excellent, and excessive cutting of a conductive filler (a carbon nanofibril and the like) may be prevented, thereby improving the conductivity of a final product.

In addition, a conductive concentrated resin composition obtained through the step of kneading and extruding may be pelletized using a pelletizer.

The method of preparing a conductive concentrated resin composition includes all the characteristics of the conductive concentrated resin composition described above.

A conductive polyamide resin composition of the present invention includes 5 to 20% by weight of the conductive concentrated resin composition; 35 to 65% by weight of a polyamide resin; 0 to 40% by weight of a poly(arylene oxide) resin; 0 to 15% by weight of an impact modifier; 1 to 15% by weight of a polar polymer; 1 to 20% by weight of a non-polar polymer; and 0 to 35% by weight of an inorganic filler. The conductive polyamide resin composition has excellent moisture stability while maintaining impact strength, heat resistance, and conductivity equal or superior to those of a conventional resin composition.

Hereinafter, the conductive polyamide resin composition and a method of preparing the same will be described in detail.

First, the conductive polyamide resin composition of the present invention includes the above-described conductive concentrated resin composition.

For example, the conductive polyamide resin composition may include 5 to 20% by weight of the conductive concentrated resin composition according to the present invention; 35 to 65% by weight of a polyamide resin; 0 to 40% by weight of a poly(arylene oxide) resin; 0 to 15% by weight of an impact modifier; 1 to 15% by weight of a polar polymer; 1 to 20% by weight of a non-polar polymer; and 0 to 35% by weight of an inorganic filler.

Since the conductive polyamide resin composition according to the present invention includes a conductive concentrated resin composition in which conductive fillers in a specific combination are concentrated, the problem of scattering with use of conventional conductive fillers may be overcome. In addition, the dispersion limit of conductive filler components may be overcome. Thus, compared to a conventional resin composition, a conductive polyamide resin composition having excellent conductivity and mechanical properties and having improved appearance properties may be provided.

In addition, since the conductive polyamide resin composition according to the present invention includes a polar polymer and a non-polar polymer in a specific weight ratio, the poor moisture stability of a polyamide resin may be overcome, thereby providing a conductive polyamide resin composition having improved moisture stability.

Hereinafter, each component of the conductive polyamide resin composition of the present invention will be described in detail.

Polyamide Resin

For example, the polyamide resin may be included in an amount of 35 to 65% by weight, 40 to 60% by weight, or to 50% by weight. Within this range, conductivity may be excellent while physical properties, such as heat resistance and mechanical strength, are maintained at a high level.

The polyamide resin may be the same as that used in the preparation of the conductive concentrated resin composition described above without particular limitation. In this case, the dispersibility of conductive fillers may be further improved, thereby providing a molded article having excellent physical properties, such as conductivity and heat resistance.

The polyamide resin includes all the characteristics of the polyamide resin described in the description for the conductive concentrated resin composition of the present invention.

Poly(Arylene Oxide) Resin

For example, the poly(arylene oxide) resin may be included in an amount of 0 to 40% by weight, 5 to 40% by weight, 10 to 35% by weight, or 20 to 35% by weight. In this case, the heat resistance and mechanical strength of a composition may be excellent. Thus, the poly(arylene oxide) resin may be advantageously used to manufacture products requiring such physical properties.

For example, the poly(arylene oxide) resin may be a polyphenylene ether (PPE) resin. As a specific example, the poly(arylene oxide) resin may include one or more polymers selected from poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, poly(2,3,6-trimethyl-1,4-phenylene)ether, poly(2,3,6-triethyl-1,4-phenylene)ether, and modified polymers thereof, or may include copolymers including the polymers. Preferably, the poly(arylene oxide) resin is poly(2,6-dimethyl-1,4-phenylene) or a copolymer thereof.

Modification of polymer in the polyphenylene ether resin means that a polymer reacts with a reactive monomer such as unsaturated carboxylic acid or an anhydride thereof and is modified into unsaturated carboxylic acid or an anhydride thereof.

As a specific example, the reactive monomer may include one or more selected from citric acid, maleic acid, itaconic acid, fumaric acid, (meth)acrylic acid, anhydrides thereof, and (meth)acrylic acid esters.

Impact Modifier

For example, the impact modifier may include one or more selected from the group consisting of an aromatic vinyl elastomer and an olefin elastomer. In this case, mechanical strength may be greatly improved while the physical properties, such as heat resistance and conductivity, of a composition are maintained at a high level.

As a specific example, the aromatic vinyl elastomer may include one or more selected from styrene-butadiene-styrene (SBS) copolymers, styrene-ethylene-butylene-styrene (SEBS) copolymers, styrene-butadiene (SB) copolymers, styrene-isoprene (SI) copolymers, styrene-isoprene-styrene (SIS) copolymers, alpha-methylstyrene-butadiene copolymers, styrene-ethylene-propylene copolymers, styrene-ethylene-propylene-styrene copolymers, styrene-(ethylene-butylene/styrene copolymer)-styrene copolymers, and modified polymers thereof.

In the present invention, modification means that a polymer reacts with a reactive monomer such as unsaturated carboxylic acid or an anhydride thereof and is modified into unsaturated carboxylic acid or an anhydride thereof.

As a specific example, the reactive monomer may include one or more selected from citric acid, maleic acid, malic acid, agaric acid, itaconic acid, fumaric acid, (meth)acrylic acid, anhydrides thereof, and (meth)acrylic acid esters.

As a preferred example, the aromatic vinyl elastomer may include one or more selected from styrene-butadiene-styrene (SBS) copolymers, styrene-ethylene-butylene-styrene (SEBS) copolymers, and maleic anhydride-modified styrene-ethylene-butylene-styrene copolymers. In this case, the conductivity and impact strength of a final product may be excellent.

For example, the olefin elastomer may be an olefin compound or a copolymer including the same. For example, the olefin compound may include one or more selected from ethylene, propylene, isopropylene, butylene, isobutylene, and octene.

As a specific example, the olefin elastomer may include one or more selected from high-density polyethylenes (HDPEs), low-density polyethylenes (LDPEs), polypropylenes (PPs), ethylene-propylene (EPM) copolymers, ethylene-propylene-diene (EPDM) copolymers, ethylene-octene copolymers, ethylene-butene copolymers, and modified polymers thereof. To ensure compatibility with a polyamide resin, a modified polyolefin is preferably used.

For example, the modified polyolefin may be a reactant of an unsaturated carboxylic acid, an anhydride thereof, or an epoxy compound; and a polyolefin polymer. Specifically, the modified polyolefin may include one or more selected from maleic anhydride-modified polyethylenes, maleic anhydride-modified polypropylenes, and maleic anhydride-modified ethylene-propylene copolymers. In this case, compatibility between an olefin-based impact modifier and a polyamide resin may be increased, thereby further improving physical properties such as heat resistance and impact strength.

In addition, the composition of the present invention may include both the aromatic vinyl elastomer and the olefin elastomer as impact modifiers. For example, the aromatic vinyl elastomer and the olefin elastomer may be mixed in a weight ratio of 1:1 to 2:1.

For example, the impact modifiers may be included in an amount of 0 to 15% by weight, 1 to 12% by weight, or 3 to 6% by weight based on the total weight of the composition. Within this range, the impact strength of the composition may be improved without deterioration in heat resistance and electrical properties.

Inorganic Filler (Excluding Nanosilicate)

The composition of the present invention may optionally include an inorganic filler as needed. For example, the inorganic filler may include one or more selected from the group consisting of glass fiber, talc, mica, wollastonite, barium sulfate, barium carbonate, and silica.

Preferably, the inorganic filler is glass fiber. In this case, the strength and heat resistance of the composition may be excellent, and the processability thereof may be improved.

In addition, the glass fiber may be coated with one or more surface treatment agents selected from epoxy silanes, amino silanes, and urethanes. In this case, the glass fiber may be easily dispersed in a resin component, thereby improving processability and physical properties.

For example, the inorganic filler may be included in an amount of 0 to 35% by weight, 5 to 30% by weight, 10 to 30% by weight, or 10 to 20% by weight based on the total weight of the composition. Within this range, the composition may have excellent physical property balances such as impact strength, heat resistance, and electrical properties.

Polar Polymer

For example, the polar polymer may be included in an amount of 1 to 15% by weight, 3 to 12% by weight, or 5 to 10% by weight. Within this range, moisture stability may be excellent without deterioration in other physical properties.

In addition, the polar polymer includes all the characteristics of the polar polymer described in the description of the conductive concentrated resin composition of the present invention.

Non-Polar Polymer

For example, the non-polar polymer may be included in an amount of 1 to 20% by weight, 3 to 15% by weight, or to 10% by weight. Within this range, moisture stability may be excellent without deterioration in other physical properties.

In addition, the non-polar polymer includes all the characteristics of the non-polar polymer described in the description of the conductive concentrated resin composition of the present invention.

Conductive Concentrated Resin Composition

The conductive polyamide resin composition according to the present invention includes the conductive concentrated resin composition as a conductive filler. In this case, a problem of scattering of a conductive filler may be solved, and the dispersion limit of a conductive filler may be improved. Thus, compared to a polyamide resin composition having a composition equivalent to that of the conductive polyamide resin composition of the present invention, heat resistance, conductivity, surface properties, and moisture stability may be greatly improved.

The conductive concentrated resin composition of the present invention may have a dispersion effect by mutual dispersion between a fibrous conductive filler and a plate-shaped conductive filler, an effect of improving heat resistance due to a nanosilicate, and an effect of increasing moisture stability due to combination of a polar polymer and a non-polar polymer. Accordingly, when the conductive concentrated resin composition is used to prepare the conductive polyamide resin composition, mechanical strength, heat resistance, moisture stability, and conductivity may be greatly increased, and appearance properties may be greatly improved, thereby providing a high-quality molded article.

For example, the conductive concentrated resin composition may be included in an amount of 5 to 20% by weight, 8 to 15% by weight, or 8 to 12% by weight based on the total weight of the conductive polyamide resin composition. Within this range, physical property balances such as impact strength, heat resistance, and conductivity may be excellent, and processability may be improved, thereby increasing the moisture stability of a final molded article.

The conductive concentrated resin composition includes all the configuration and technical features described in the conductive concentrated resin composition and the method of preparing the same described above, and thus description thereof will be omitted.

In addition, the conductive polyamide resin composition of the present invention may optionally include one or more additives selected from flame retardants, lubricants, plasticizers, heat stabilizers, antioxidants, light stabilizers, toning agents, and antistatic agents, as needed.

For example, the conductive polyamide resin composition according to the present invention may have a heat deflection temperature of 180° C. or more, 185° C. or more, 180 to 280° C., 185 to 280° C., 190 to 260° C., 230 to 250° C., or 235 to 250° C. Thus, the conductive polyamide resin composition may have excellent heat resistance.

The heat deflection temperature of the conductive polyamide resin composition including the conductive concentrated resin composition according to the present invention may be more than 10° C., more than 15° C., or 20° C. higher than that of a resin not including the conductive concentrated resin composition and having a composition equivalent to that of the conductive polyamide resin composition. In addition, impact strength and surface quality may be greatly improved, and moisture stability may be excellent.

For example, the conductive polyamide resin composition according to the present invention may have a surface resistance of $10^{11}$ Ohm/sq or less, $10^{10}$ Ohm/sq or less, $10^{10}$ to $10^{6}$ Ohm/sq, or $10^{9}$ to $10^{7}$ Ohm/sq, and thus may have excellent conductivity.

In addition, the conductive polyamide resin composition according to the present invention may have a moisture absorption rate of 1.5% or less, 0.5 to 1.2%, or to 1.0%. Within this range, moisture stability may be excellent without deterioration in other physical properties.

For example, a method of preparing a conductive polyamide resin composition of the present invention may include a step of kneading and extruding 5 to 20% by weight of the conductive concentrated resin composition of the present invention; 35 to 65% by weight of a polyamide resin; 0 to 40% by weight of a poly(arylene oxide) resin; 0 to 15% by weight of an impact modifier; 1 to 15% by weight of a polar polymer; 1 to 20% by weight of a non-polar polymer; and 0 to 35% by weight of an inorganic filler.

For example, the step of kneading and extruding may be performed at a barrel temperature of 200 to 330° C., 250 to 320° C., 280 to 310° C., or 290 to 310° C. and a rate of screw rotation of 100 to 500 rpm, 150 to 400 rpm, 250 to 350 rpm, or 250 to 310 rpm. Within this range, a composition may be prepared efficiently while minimizing deformation of resin components.

In addition, a molded article may be manufactured using the conductive polyamide resin composition through a conventional molding process. For example, an extrusion-molded article, an injection-molded article, or a blow-molded article may be manufactured using the conductive polyamide resin composition through extrusion molding, injection molding, or blow molding, and these molded articles may be used in various fields.

Other conditions (for example, the configuration or specification of an extruder, extrusion conditions, additives, etc.) that are not specified in the description of the conductive concentrated resin composition and the method of preparing the same according to the present invention may be appropriately selected and applied, without particular limitation, when the conditions are within a range commonly practiced in the art.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

The materials used in Examples and Comparative Examples below are as follows.

Polyamide (PA): Polyamide 66 (Product Number: 3600; Invista Co.)

Polar polymer: LC670 (density: 0.870 g/cm 3; melt index: 5 g/10 min; LG Chemical Co.) was modified with 2% by weight of maleic anhydride and used as the polar polymer.

Non-polar polymer: LC875 (density: 0.870 g/cm 3; melt index: 33 g/10 min; LG Chemical Co.)

Carbon nanofibril: A carbon nanotube having a BET surface area of 200 to 300 $m^2/g$ (CP1002M; LG Chemical Co.)

Carbon Nanoplate: A Layered Exfoliation Product having an average thickness of 2 to 50 nm was used, and the layered exfoliation product was prepared using natural graphite or expanded graphite through mechanical exfoliation using ultrasonic grinding.

Nanosilicate: Nanoclay (30B; SCP Co.)

Polyphenylene ether (PPE): Poly(2,6-dimethyl-1,4-phenylene)ether (100 L; Mitsubishi CO.)

Styrene-based impact modifier: A styrene-butadiene-styrene copolymer (SBS 501; LG Chemical Co.)

Inorganic filler: Glass fiber having a diameter of to 13 μm and a length of 4 mm, surface-treated with an epoxy silane (product number: 910, Owens Corning Co.)

EXAMPLES

1. Preparation of conductive concentrated resin composition

Example 1

(a) 100 parts by weight of a base resin including % by weight of a polyamide 66 resin, 15% by weight of a polar polymer, and 25% by weight of a non-polar polymer, (b) 15 parts by weight of a carbon nanofibril, (c) 4 parts by weight of a carbon nanoplate, and (d) 2 parts by weight of nanoclay were melt-kneaded using a twin-screw extruder (T40; SM Co.) equipped with 16 kneading blocks, and then extruded to prepare a conductive concentrated resin composition in the form of pellets. At this time, the cylinder temperature of the twin-screw extruder was set to 300° C., and a rate of screw rotation was set to 300 rpm. The prepared pellets are abbreviated as 'PMB-15 phr'.

Example 2

Pellets were prepared in the same manner as in Example 1, except that (b) 20 parts by weight of a carbon nanofibril, (c) 2 parts by weight of a carbon nanoplate, and (d) 1 part by weight of nanoclay were added to (a) 100 parts by weight of a base resin including 60% by weight of a polyamide 66 resin, 15% by weight of a polar polymer, and % by weight of a non-polar polymer. The prepared pellets are abbreviated as 'PMB-20 phr'.

Comparative Example 1

(a) 100 parts by weight of a base resin including only polyamide 66 resin and (b) 15 parts by weight of a carbon nanofibril were melt-kneaded using a twin-screw extruder (T40; SM Co.) equipped with 7 kneading blocks, and then extruded to prepare pellets. At this time, the cylinder temperature of the twin-screw extruder was set to 300° C., and a rate of screw rotation was set to 300 rpm. The prepared pellets are abbreviated as 'REF-1'.

Comparative Example 2

A conductive concentrated resin composition in the form of pellets was prepared in the same manner as in Example 1, except that without addition of (c) a carbon nanoplate and (d) nanoclay, (b) 15 parts by weight of a carbon nanofibril was added to (a) 100 parts by weight of a base resin including 60% by weight of a polyamide 66 resin, % by weight of a polar polymer, and 25% by weight of a non-polar polymer. The prepared pellets are abbreviated as 'REF-2'.

Comparative Example 3

A conductive concentrated resin composition in the form of pellets was prepared in the same manner as in Example 1, except that without addition of (c) a carbon nanoplate and (d) nanoclay, (b) 20 parts by weight of a carbon nanofibril was added to (a) 100 parts by weight of a base resin including only polyamide 66 resin. The prepared pellets are abbreviated as 'REF-3'.

2. Preparation of Conductive Polyamide Resin composition

Examples 3 to 8 and Comparative Examples 4 to 9

Pellets were prepared by melt-kneading and extruding the components according to the compositions and contents shown in Table 1 below. At this time, a rate of screw rotation was set to 300 rpm, and a feeding rate was set to 60 kg/hour. The prepared pellets were molded using an injection machine (80 tons; Engel Co.) at a cylinder temperature of 290° C. and a mold temperature of 80° C. to prepare specimens for measuring physical properties.

Test Examples

The properties of the specimens prepared in Examples 3 to 8 and Comparative Examples 4 to 9 were measured using the following methods, and the results are shown in Table 1 below.

Room temperature impact strength (J/m): A specimen having a thickness of 4 mm was notched, and the Notched Izod impact strength of the specimen was measured at a room temperature (23° C.) according to ISO 180A.

Low temperature impact strength (J/m): A specimen having a thickness of 4 mm was notched, and the Notched Izod impact strength of the specimen was measured at a low temperature (−30° C.) according to ISO 180A.

Heat deflection temperature (° C.): The heat deflection temperature of a specimen having a thickness of 4 mm was measured at a stress of 0.45 MPa according to ISO 75-2.

Surface resistance (Ohm/sq): The surface resistance of an injection specimen was measured using PRS-801 (Prostat Co.).

Appearance properties: The appearance of a flat specimen of 100 mm×100 mm×3 mm size was judged by the naked eye (G: no pinhole on surface; B: few pinholes on surface; and BB: many pinholes on surface).

Moisture absorption rate (%): A flat specimen of 100 mm×100 mm×3 mm size was injected using an injection machine (80 tons; Engel Co.), and immersion of the specimen was performed at 40° C. for 72 hours. Then, a moisture absorption rate was calculated using Equation 1. In this case, moisture stability is inversely proportional to the moisture absorption rate.

Moisture absorption rate (%)=[(Weight of specimen after moisture absorption−weight of specimen before moisture absorption)/weight of specimen before moisture absorption]×100     [Equation 1]

TABLE 1

| Classification | Examples | | | | | | Comparative Examples | | | | | |
| --- | --- | --- | --- | --- | --- | --- | --- | --- | --- | --- | --- | --- |
| | 3 | 4 | 5 | 6 | 7 | 8 | 4 | 5 | 6 | 7 | 8 | 9 |
| PA 66 | 60 | 50 | 60 | 50 | 50 | 40 | 65 | 60 | 42 | 60 | 60 | 70 |
| PPE | 10 | | | 20 | 20 | 35 | | 30 | 40 | 10 | 10 | 10 |
| Impact modifier | | | | 5 | 5 | 5 | | 8 | 10 | | | |
| Polar polymer | 5 | 5 | 10 | 10 | 5 | 5 | | | 5 | 5 | 5 | 5 |
| Non-polar polymer | 5 | 5 | 10 | 5 | 10 | 5 | 5 | | | 5 | 5 | 5 |
| Inorganic filler | 10 | 20 | 10 | | | | 20 | | | 10 | 10 | 10 |
| Carbon nanotube | | | | | | | | 2 | 3 | | | |
| PMB-15 phr | 10 | | | 10 | | | | | | | | |
| PMB-20 phr | | 10 | 10 | | 10 | 10 | | | | | | |
| REF-1 | | | | | | | 10 | | | 10 | | |
| REF-2 | | | | | | | | | | | 10 | |
| REF-3 | | | | | | | | | | | | 10 |
| Physical properties measurement results | | | | | | | | | | | | |
| Room temperature impact strength | 130 | 120 | 210 | 320 | 300 | 360 | 140 | 180 | 200 | 300 | 290 | 280 |
| Low temperature impact strength | 90 | 100 | 160 | 250 | 240 | 280 | 90 | 120 | 140 | 190 | 180 | 150 |
| Heat deflection temperature | 235 | 235 | 235 | 190 | 193 | 185 | 230 | 174 | 171 | 190 | 190 | 185 |
| Surface resistance | 10^10 | 10^8 | 10^9 | 10^10 | 10^8 | 10^8 | 10^11 | 10^11 | 10^9 | 10^11 | 10^10 | 10^8 |
| Appearance properties | G | G | G | G | G | G | B | BB | BB | B | B | B |
| Moisture absorption rate (%) | 0.9 | 0.8 | 1.0 | 0.8 | 0.7 | 0.7 | 2.0 | 1.4 | 1.2 | 1.4 | 1.2 | 1.3 |

As shown in Table 1, it was confirmed that, compared to Comparative Examples 4 to 9, in which a polar polymer, a non-polar polymer, or the concentrated composition according to the present invention was not included, in the cases of Examples 3 to 8, in which the conductive concentrated composition according to the present invention was included, moisture stability was greatly improved without deterioration in impact strength, heat resistance, and conductivity. In particular, in the case of Comparative Example 4 in which a fibrous carbon nanofibril was used alone, a mutual dispersion effect was reduced due to re-flocculation, resulting in generation of surface pinholes and decrease in moisture stability. In addition, referring to the results of Comparative Examples 5 and 6, it can be confirmed that, when the conductive concentrated composition is not added and a carbon nanotube is directly added during preparation of a conductive polyamide resin composition, appearance properties deteriorate.

The invention claimed is:

1. A conductive concentrated resin composition, comprising:
   (a) 100 parts by weight of a base resin comprising 50% to 95% by weight of a first polyamide resin, 2.5% to 20% by weight of a first polar polymer, and 2.5% to 30% by weight of a first non-polar polymer based on a total weight of the base resin;
   (b) 10 parts to 40 parts by weight of a carbon nanofibril;
   (c) 0.5 parts to 5 parts by weight of a carbon nanoplate; and
   (d) 0.5 parts to 4 parts by weight of a nanosilicate,
   based on 100 parts by weight of the base resin,
   wherein the first polyamide resin is one or more selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I,
   wherein the first polar polymer is an ethylene-α-olefin copolymer modified with at least one of α,β-unsaturated dicarboxylic acid and anhydrides thereof, wherein the α-olefin included in the first polar polymer has 3 to 10 carbon atoms, wherein the first polar polymer is a graft polymer of the at least one of α,β-unsaturated dicarboxylic acid and anhydrides thereof with an ethylene-α-olefin copolymer backbone or a copolymer of the at least one of α,β-unsaturated dicarboxylic acid and anhydrides thereof, the ethylene and the α-olefin, and
   wherein the first non-polar polymer is an ethylene-α-olefin copolymer having no polar group, wherein the α-olefin included in the first non-polar polymer has 3 to 10 carbon atoms.

2. The conductive concentrated resin composition according to claim 1, wherein the first polar polymer comprises 0.5% to 4% by weight of the at least one of 4-unsaturated dicarboxylic acid and anhydrides thereof.

3. The conductive concentrated resin composition according to claim 1, wherein the carbon nanofibril has a BET surface area of 180 $m^2/g$ to 600 $m^2/g$.

4. The conductive concentrated resin composition according to claim 1, wherein the carbon nanoplate has an average thickness of 2 nm to 50 nm.

5. A conductive polyamide resin composition, comprising:
   5% to 20% by weight of the conductive concentrated resin composition according to claim 1;
   35% to 65% by weight of a second polyamide resin, wherein the first and second polyamide resins are the same;
   0% to 40% by weight of a poly(arylene oxide) resin, wherein the poly(arylene oxide) resin comprises one or more selected from the group consisting of poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, poly(2,3,6-trimethyl-1,4-phenylene)ether, poly(2,3,6-triethyl-1,4-phenylene)ether, modified polymers thereof, and copolymers thereof;
   1% to 15% by weight of a second polar polymer, wherein the first and second polar polymers are the same;
   1% to 20% by weight of a second non-polar polymer, wherein the first and second non-polar polymers are the same;
   0% to 15% by weight of a third polar polymer or a third non-polar polymer as an impact modifier, wherein the third polar polymer or the third non-polar polymer comprises an aromatic vinyl elastomer; and
   0% to 35% by weight of an inorganic filler, wherein the inorganic filler comprises one or more selected from the group consisting of glass fiber, talc, mica, wollastonite, barium sulfate, barium carbonate, and silica,
   based on a total weight of the conductive polyamide resin composition,
   wherein the modified polymer of the poly(arylene oxide) resin is a reaction produce of the poly(arylene oxide) resin with one or more reactive monomers selected from the group consisting of citric acid, maleic acid, itaconic acid, fumaric acid, (meth)acrylic acid, anhydrides thereof, and (meth)acrylic acid esters.

6. The conductive polyamide resin composition according to claim 5, wherein the aromatic vinyl elastomer comprises one or more selected from the group consisting of styrene-butadiene-styrene (SBS) copolymers, styrene-ethylene-butylene-styrene (SEBS) copolymers, styrene-butadiene (SB) copolymers, styrene-isoprene (SI) copolymers, styrene-isoprene-styrene (SIS) copolymers, alpha-methylstyrene-butadiene copolymers, styrene-ethylene-propylene copolymers, styrene-ethylene-propylene-styrene copolymers, and modified polymers thereof, wherein the modified polymer of the aromatic vinyl elastomer is a reaction product of the aromatic vinyl elastomer with one or more reactive monomer selected from the group consisting of citric acid, maleic acid, malic acid, agaric acid, itaconic acid, fumaric acid, (meth)acrylic acid, anhydrides thereof, and (meth)acrylic acid esters.

7. The conductive polyamide resin composition according to claim 5, wherein the conductive polyamide resin composition has a moisture absorption rate of 1.5% or less.

8. A molded article comprising the conductive polyamide resin composition of claim 5.

9. A method of preparing a conductive concentrated resin composition, the method comprising:
   kneading and extruding (a) 100 parts by weight of a base resin comprising 50% to 95% by weight of a first polyamide resin, 2.5% to 20% by weight of a first polar polymer, and 2.5% to 30% by weight of a first non-polar polymer; (b) 10 parts to 40 parts by weight of a carbon nanofibril; (c) 0.5 parts to 5 parts by weight of a carbon nanoplate; and (d) 0.5 parts to 4 parts by weight of nanoclay using an extruder equipped with 9 or more kneading blocks, wherein the first polyamide resin is one or more selected from the group consisting of polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I, wherein the first polar polymer is an ethylene-α-olefin copolymer modified with at least one of α,β-unsaturated dicarboxylic acid and anhydrides thereof, wherein the α-olefin included in the first polar polymer has 3 to 10 carbon atoms, wherein the first polar polymer is prepared by adding the at least one of α,β-unsaturated dicarboxylic acid and anhydrides thereof to an unmodified ethylene-α-olefin copolymer and performing a graft polymerization, or prepared by adding the at least one of α,β-unsaturated dicarboxylic acid and anhydrides thereof as a comonomer to an unmodified ethylene-α-olefin copolymer and performing a copolymerization, and wherein the first non-polar polymer is an ethylene-α-olefin copolymer having no polar group, wherein the α-olefin included in the first non-polar polymer has 3 to 10 carbon atoms.

* * * * *